United States Patent [19]

Schossow

[11] 4,028,594

[45] June 7, 1977

[54] SAFETY CIRCUIT FOR ELECTRICAL EQUIPMENT

[76] Inventor: George W. Schossow, 2316 Lilac Lane, White Bear Lake, Minn. 55110

[22] Filed: Nov. 7, 1975

[21] Appl. No.: 629,793

[52] U.S. Cl. .................................. 307/326; 361/49; 361/77
[51] Int. Cl.² ......................................... H02H 3/14
[58] Field of Search ............ 317/18 A, 18 B, 18 R, 317/48, 47, 43, 46, 9 A, 9 D; 324/133; 340/248 A, 248 B

[56] References Cited

UNITED STATES PATENTS

| | | | |
|---|---|---|---|
| 2,628,999 | 2/1953 | Bruyne | 317/43 X |
| 2,922,925 | 1/1960 | Gerrard | 317/18 B X |
| 2,999,189 | 9/1961 | Gerrard | 317/18 B |
| 3,176,219 | 3/1965 | Behr | 317/18 B X |
| 3,413,487 | 11/1968 | Gershen | 317/43 X |
| 3,426,342 | 2/1969 | Langis | 317/18 B X |
| 3,659,152 | 4/1972 | Langis | 317/18 B |
| 3,944,891 | 3/1976 | McDonald et al. | 317/48 |
| 3,946,282 | 3/1976 | Weiss et al. | 317/47 X |

*Primary Examiner*—J D Miller
*Assistant Examiner*—Patrick R. Salce
*Attorney, Agent, or Firm*—John C. Barnes

[57] ABSTRACT

An electrical control positioned between the power cord and the electrically energized appliance to require a proper ground for the electrical appliance before said apliance can be energized by the actuating switch. A test circuit actuated by the presence of current between the B+ line and ground line prior to actuation of the circuit from the B+ line to the load and to the neutral line requires that the ground line be properly installed before the circuit is closed to the load of the electrical appliance to energize the same and maintain it energized.

11 Claims, 4 Drawing Figures

SAFETY CIRCUIT FOR ELECTRICAL EQUIPMENT

BACKGROUND OF THE INVENTION

1. Field of the Invention This invention relates to a circuit for electrical appliances, and in particular, to a safety or test circuit which requires the presence of a proper ground and a properly wired electrical outlet if the electrical appliance is to be operated.

2. Description of the Prior Art

There exists in the prior art various ways of grounding electrical appliances such that the same will not produce any shock or be hazardous to the operator. These ground lines, however, are not effective unless the outlet is properly grounded or unless the three-wire power cord is properly wired to the appliance. Also, it is possible to bypass the ground and thus the device is potentially dangerous.

The present invention assures that the cord is properly connected to the electrically energized load of the appliance and that the ground is properly connected to the appliance. Further, the device of the present invention checks whether the receptacle for the three-wire plug on the cord is properly wired.

Electrical safety is a never ending challenge to our modern society. This is especially true with portable electric equipment with a plug cord. The inherent danger is that the operator of this equipment may be exposed to or in contact with many "ground" paths for electric current to follow. If a current leak develops the operator may well be the conductor to ground with fatal results. The main methods of countering this danger are: (1.) utilize a third wire in the cord to act as earth ground and thus drain off any unsolicited current leak; (2) doubly insulating electric power equipment to insure against current leak; (3) utilize the neutral wire as earth ground and thus drain any current leak back to neutral which in effect may act as ground; and (4) utilize a ground fault indicator in which a current leak theoretically will disrupt current before a lethal amount of current could cause a fatality or a lack of ground visible indicator. Method No. (1) is a good method provided the electric outlet is grounded and the ground is utilized. This is very unsatisfactory for numerous reasons: (a) properly wired and grounded outlets are still not abundantly available, (b) adaptors or "cheaters" are readily available to solve the lack of the above outlets, but in so doing, the safety ground feature is bypassed or lost, and (c) the above method also utilizes the ground prong to "key" the neutral line and the current line of the outlet to the current line and neutral line of the cord. This keying feature is lost when not utilizing the ground prong when using an adaptor or "cheater". This safety feature is also lost if the electric outlet is not properly wired according to code.

Method No. 2 is fairly acceptable except where water may enter the electric device and conduct current around the insulation. This metod is also quite costly to utilize.

Method No. 3 is very unacceptable. Many attempts have been made to insure that the cord neutral wire is connected to the receptacle or outlet neutral wire. This has not been achieved. Some of the latest ungrounded outlets have different sized female jacks to correspond with different size jack prongs on the cord. This method is almost exclusively used on portable T.V. sets where neutral is utilized as a "floating ground" on the chassis of the set. An extension cord, an adaptor or any improperly wired outlet will void this method from contributing to safety. The insulated cabinet and control knobs do achieve some degree of safety against reversing the current wire and neutral wire within the chassis. Loss of an insulated knob or bolting or the chassis to an exterior metal mounting bracket which is common practice in hanging T.V. sets from walls or ceilings in hospitals cause extreme electrical hazards.

The ground fault indicator would be okay, except it must be so sensitive to current leak below dangerous current levels that it will break circuits for other reasons than those of safety and the false interruptions are a nuisance and a hazard if you are depending on the appliance. The visible indicators do not protect against using the appliance and achieve only limited safety. All of these safety methods have their positive attributes provided there is no circumscribing of the intended safety as a matter of economy, convenience, or through necessity.

SUMMARY OF THE INVENTION

The purpose of my invention is to insure that electrical outlets (grounded) are properly wired according to electrical code, that the power cord is correctly connected to the electrical outlet with neutral to neutral, current to current, and to assure that ground safety is utilized and cannot be bypassed. More specifically, with my invention in an electrical appliance: (1) ground safety to drain current leaks from the device has to be connected to earth ground; (2) the neutral wire in the device has to be connected to the neutral jack in electrical outlet; and (3) the electrically hot or current wire in a device has to be connected to the hot current jack of the electrical outlet. Any deviation from these conditions will not permit the electrical appliance to operate. My invention senses that these three conditions are present before permitting an electrical device to function. Further, my invention assures any two wire cord (undgrounded) to be properly plugged into an ungrounded outlet by using an extraneous (to the outlet) earthground lead, which is utilized to ground the appliance in a lead from a ground stake, or water pipe is jacked into a power cord (or device) or connected to the tail of an adaptor.

Other prior art sensing circuits for protecting an operator against current leaks are known which measure the current flow between the hot and neutral wires to the load. One such device is illustrated in the Jan. 9, 1975 issue of *Machine Design* magazine.

The known circuits, however, do not generally afford the protection desired to assure the outlet is properly wired and to assure the cord to the appliance properly grounds the appliance to substantially eliminate the possibility of shock. This invention also guarantees the ground safety cannot be bypassed by using adaptors with outlets that are not grounded.

This invention provides a safety circuit which is energized by the existence of a properly wired and grounded outlet and the existence of a properly connected cord to the electrical appliance to be operated. The present invention comprises a circuit connected in the three-wire cord which will be triggered to shift current flow to energize the electrically energized load in response to the existence of a current between the B+ line (hot line) and a ground line. The circuit of the present invention comprises a first switch means connected in series circuit relation with the B+ line of the power cord and the ground line extending to the casing of the electrical appliance or load to be energized. A switching device, also in series with the B+ line and the ground line, will be operated to break this circuit if after operating the switch momentarily there is current flow. If there is no current flow, indicating an improper ground at the outlet or to the frame of the applicance, no current can flow, even with the switch closed, and the appliance load will not be energized. A line from the casing is connected to one side of the switching means. A line from the B+ line is connected to the other side of the switching means through the switching device which is connected, after initial energization, through a seal- in or latching switch means to the neutral line of the cord and to a normally open contact of said switch means. The other side of the normally open switch is connected to the neutral wire of the cord. Upon actuation of the swtich means, the presence of and an instantaneous flow of current through said B+ line and said line from casing to one side of said switch means energizes the switching device to seal out the B+ line to the ground and to seal in the neutral wire to the load so long as said switch means stays closed and so long as current flowed immediately indicating the properly wired outlet and properly grounded appliance.

DESCRIPTION OF THE DRAWING

The present invention will be more fully understood upon the reading of the following description which refers to the accompanying drawing which illustrates several embodiments of the present invention and wherein.

DESCRIPTION OF THE PREFERRED EMBODIMENTS

Figure 1:
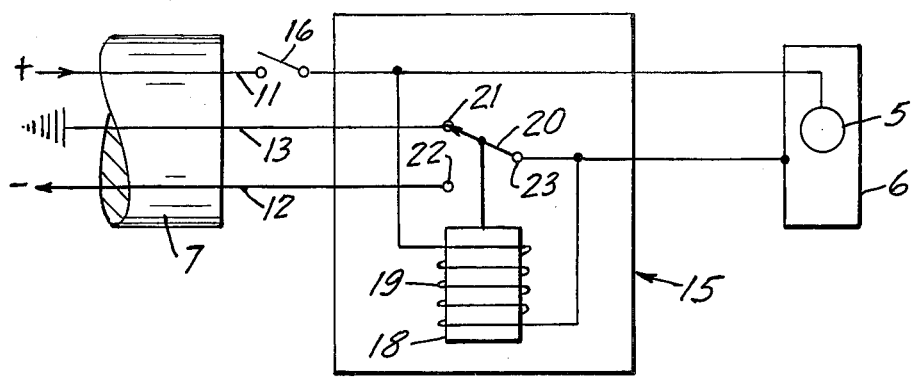
FIG. 1 is a schematic circuit diagram of one embodiment of the present invention adapted for an appliance where the chassis is maintained at neutral and not ground potential such as a television set.

Referring now to the drawing there is shown several embodiments of circuits for protecting various appliances by the use of a circuits between the electrical plug and the appliance which assures the chassis is not "hot" and which will protect the users by not energizing the appliance unless the cord is properly connected.

Referring now to FIG. 1, there is shown an electrical circuit diagram for protecting an electrical appliance having a load 5 and a chassis or frame 6. Examples of such loads are the circuitry of television sets or the like where the chassis is maintained at negative or neutral potential. In this embodiment the power cord is a three-wire cord 7 through which extends, from a conventional three-pronged plug, a power "B+" line 11, a neutral line 12 and a ground line 13. The switching device of the present invention is incorporated between the plug and the load and is indicated generally by the reference numeral 15. The appliance has an on/off switch 16. The switch 16 is a disposed in series in the B+ line 11 and the opposite the switch the line 11 is connected to the safety switching device of the present invention which comprises an energizable switching member such as a "make before break" relay 18. The relay 18 has a coil 19 and the armature drives a switch blade 20 of the type such that the contacts 21, 22 of the switch, one of which is normally closed, will remain closed until both are closed and then the first will open. In this circuit the switch 20 will normally close a line between the ground line 13 and the chassis 6 until the switching device is triggered to connect the neutral line 12 by contact 22 to the primary contact 23 of the switch and to the chassis 6. In this device the chassis 6 is normally maintained at neutral potential such that there is no shock received when one touches the chassis of the appliance. Normally these devices with a two-way plug are particularly dangerous because, if the plug is plugged in the wrong manner, the chassis is normally connected to the B+ line, and anyone being grounded who touches the chassis, due to the fact that a knob or control member is exposed, may receive serious injury.

With the present invention the operator is protected since the appliance will not be energized until the plug is properly inserted in the socket with the B+ line 11 connected to the B+ voltage and the ground line properly grounded. If the outlet is improperly wired the appliance will not be energized because the neutral line which might be connected to the B+ of the outlet ould be opened due to the fact that the line 12 is normally open as relay switch 20 is normally closed between contact 21 and 23. A properly wired outlet and a properly wired cord will assure the operation of the appliance and the protection for the appliance such that the chassis would not be connected to the B+ line.

Figure 2:
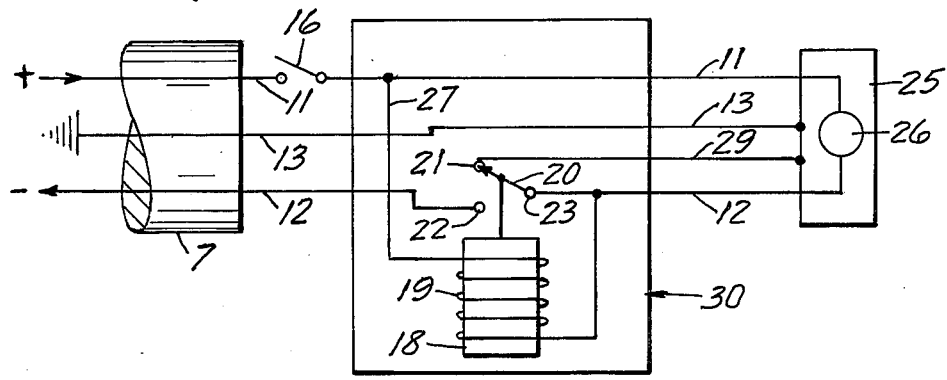
FIG. 2 is a schematic electrical diagram utilizing a circuit similar to that of FIG. 1 wherein the chassis of the appliance is connected to ground.

In the embodiment illustrated in FIG. 2 the appliance illustrated is that common to a hand drill, mixer, hair dryer, hair curler etc. where it is desired that the frame 25 is normally connected direct to ground as by the ground line 13. The load 26 is connected between the B+ line 11 and the neutral line 12. In this embodiment the safety switching device 30 is provided with a similar relay 18 and switch 20, however the contact 21, instead of being connected directly to the ground line 13, is connected to a line 29 connected between the contact 21 and the frame 25 of the appliance. When the on/off switch 16 in series with B+ line 11 is closed, the B+ line 27 to coil 19 of the relay 18 is engergized and if line 13 is properly grounded, the coil 19 will be energized through switch 20, the line 29, the frame 25 and line 13. This will eventually trigger the make before the break switch 20 such that the load 26 is connected between the B+ line 11 and the neutral line 12. The frame 25 of the appliance is continually maintained at ground potential by direct connection with the line 13. The B+ line is again disconnected from the ground line.

Figure 3:
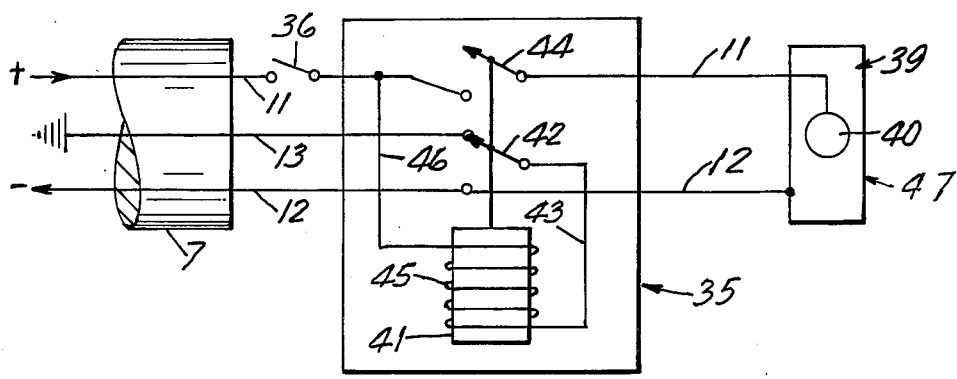
FIG. 3 is a schematic circuit diagram of an embodiment for television sets wherein the set is protected by a triggering device.

Referring now to the schematic diagram of FIG. 3, the cord 7 is provided with the B+ line 11, ground line 13 and the neutral line 12, and a safety switching device 35 is disposed between an on/off switch 36 and an appliance 39. In this embodiment the device 35 is used for protecting an appliance 39 provided with an energizable load 40 and the frame 47 is to be maintained at neutral potential. The safety device 35 for triggering the energization of the load 40 comprises a relay 41 having a pair of switches 42 and 44 connected to the armature. The switch 44 is a normally open switch and the switch 42 is a single pole double throw switch. In the normal position the switch 42 is connected between the ground line 13 and a line 43 leading to the coil 45 of the relay 41. When the switch 36 is closed, B+ voltage is provided to one side of the coil 45 through a line 46 and the other end of the coil is connected through line 43 to the switch 42 and to the ground line 13. This serves as a safety check to determine whether the plug and the outlet are properly wired. The neutral line 12 runs to a contact of the switch 42 and the line runs from that contact direct to the frame 47 to which the neutral side of the load 40 is connected. The load will not be energized unless there is a presence of current through the triggering device 35 such that the coil 45 will be energized to move the armature and close switch 44, closing a B+ line to the load 40. Triggering of the device 35 also causes movement of switch 42 which locks or latches in the triggering device or relay 41 between the B+ line 11 and the neutral line 12 to maintain the swtiches closed and the load 40 energized. The appliance is de-energized by the opening of the switch 36.

Figure 4:
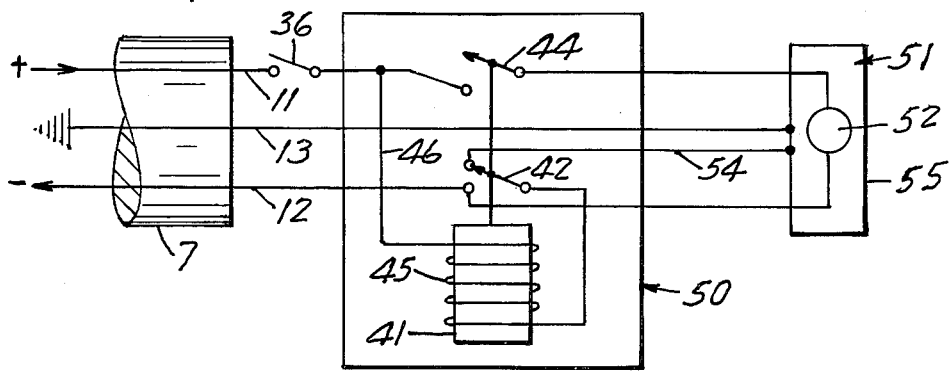
FIG. 4 is a schematic circuit diagram of an embodiment similar to that of FIG. 3 wherein the appliance chassis is maintained at ground potential.

Referring now to FIG. 4, there is illustrated a safety switching device 50 corresponding generally to the device 35 and connected to an appliance 51. The appliance 51 is an appliance where it is desirable to maintain the appliance at ground potential. This appliance may be a saw, a hedge trimmers, hand drills, etc., as indicated above for the appliance of FIG. 2. In this embodiment the switch 42 is normally connected between a line 54 connected to a frame 55 of the appliance. In this embodiment if the outlet is properly wired and the cord is properly connected to the appliance, the chassis or frame 55 is normally grounded. Upon closing the on/off switch 36 the current through line 46 and coil 45 is directed through the switch 42 via line 54 to the frame 55. Since the frame is conductive, the coil is then connected to ground via line 13 to the outlet. With the ground available the coil 45 will be energized, moving the armature to shift the switches 44 and 42. When the switch 42 is shifted the coil of relay 41 is latched in between the neutral line 12 via switch 42 and line 11 via line 46 and switch 36. The appliance will operate as switch 44 is closed between switch 36 and the load 52 and the load will continue to be energized until switch 36 is again opened. This causes the triggering device to reset opening switch 44 and shifting switch 42 to ground.

The safety devices of this invention may also be connected to an appliance which is a circuit or wiring testing device wherein the load is a signalling device to give a visible or audible signal. Such a device would make it convenient to check outlets to varify they are properly wired.

The safety device of this invention has at least five terminals wherein the B+ conductor is connected to two terminals, an incoming line and output line, a terminal for contact to an earth ground line, and two terminals to connect the neutral line to the device and from the device to the appliance.

An example of a relay for use in the safety device as illustrated in FIGS. 3 and 4 is a relay sold as No. RIOD-E1 -Y2 -115 volt by Potter Brumfield Company, 1200 E. Broadway, Princeton, Ind. 47670.

Having thus described the preferred embodiments it is to be appreciated that solid state circuitry, i.e., flip flops, etc. may be substituted for the relay switches illustrated therein without departing from the spirit of the present invention as defined in the appended claims, however for the transformers etc. to lower the voltages fo solid state design, the designated relays are believed to be commercially equivalent. The on/off switch 16 or 36 could be a thermostatically controlled switch, a pressure sensitive switch, position sensitive switch, or a switch sensitive to gas, smoke, light, etc. for use with various types of appliances.

I claim:

1. A safety circuit for use with appliances having a load and a three wire cord having a plug, a B+ line, a neutral line, and a ground line, said circuit comprising manually operated switch means in series with said B+ line for closing a circuit upon operation of said switch means, and
switching means in series with said manually operated switch means and connected to said neutral line and a said ground line to be responsive to the presence of current between said B+ line and ground when said manually operated switch means is operated, said switching means including conducting means which are triggered upon said presence of current for closing a circuit between said B+ line and said neutral line to a load, for placing said switching means in parallel with said load to latch in said switching means and maintain the circuit to said load closed, and for simultaneously opening the ground line to said switching means.

2. A safety circuit according to claim 1 wherein said switching means is a relay having a single pole double throw switch and a coil adapted for connection to the B+ line of a cord and the primary contact of said switch, the other contacts of said switch being connected to said ground line at ground potential and to said neutral line 3. A safety circuit according to claim 2 wherein said relay has a further switch interposed in said B+ line to normally open said B+ line and close it to energize the load upon activation of said relay.

4. A safety device to be interposed in an appliance having a power cord with three conductors, a B+ conductor, neutral conductor, and earth ground conductor, between an operating on/off switch means in said B+ conductor for energizing the load of said appliance and said load, said device being connected to each of said three conductors, said device comprising means for sensing the presence of current between the B+ conductor and the earth conductor when said on/off switch means is closed, means responsive to the presence of said current for connecting said neutral conductor through said device to energize a said load and simultaneous disconnect any connection between the B+ conductor and the ground conductor, and means for latching in said means for sensing the presence of current between said B+ conductor and said neutral conductor.

5. A safety device according to claim 4 wherein said device includes means for connecting the device to an earth ground line extending from a said appliance to connect said device between said B+ conductor and earth ground from said appliance and to said three conductor power cord to sense the presence of current therebetween before connecting said neutral conductor of said cord to said appliance.

6. An electrical appliance having attached thereto a three wire power cord having a three prong plug, a B+ line, a neutral line, and an earth ground line, an on/off switch in said B+ line, an electrically energized load, a chassis enclosing said load, and a safety switching device connected between said on/off switch and said load in said B+ line, to said neutral line, and to said ground line to be responsive to the presence of current flow between said B+ line and ground when said on/off switch is operated, said switching device including conducting means which are triggered upon said presence of current for closing a circuit between said B+ line and said neutral line to said load, for placing said switching device in parallel with said load to latch in said switching device and maintain the circuit to said load closed, and for simultaneously disconnecting any circuit between said B+ line and said earth ground line.

7. An appliance according to claim 6 wherein said switching device comprises:
   a relay having a single pole double throw switch and a coil to operate said switch, said coil being connected between said B+ line and said primary switch pole which is also connected to said load, said switch contacts being connected to said earth ground and to said neutral line whereby upon energization of said coil said switch closes the circuit between said neutral line and said load and opens the circuit between said B+ line and ground.

8. An electrical appliance according to claim 6 wherein said switching device comprises a relay having a single pole double throw switch and a coil connected to the B+ line of said cord and the primary contact of said switch, the other contacts of said switch being connected to said earth ground line and to said neutral line, said earth ground line of said cord being connected to the chassis of said appliance and a separate line connecting said chassis to said contact.

9. An electrical appliance according to claim 8 wherein said relay has a further switch interposed in said B+ line to normally open said B+ line and close it to energize the load upon activation of said relay.

10. An electrical appliance according to claim 6 wherein said switching device comprises a relay having a pair of switches, a single pole double throw switch and at least a single pole single throw switch, said single pole single throw switch being connected in series with said on/off switch and said load between said line between said B+ line and said switching device and said load, and said single pole double throw switch having the primary contact connected to said relay and the other contacts connected to an earth ground line and to the neutral line whereby upon energization of the coil by the presence of current flow between the B+ line and the earth ground line said single pole double throw switch will close a circuit between said neutral line and said relay and close said single pole single throw switch in said B+ line to energize said load.

11. An electrical appliance according to claim 10 wherein said earth ground line connected to said switch contact extends from said chassis of said appliance and the earth ground conductor of said cord is connected direct to said chassis.

* * * * *